May 27, 1924.
W. V. HUNT
1,495,416
ELECTRIC RAILWAY SYSTEM
Filed Feb. 19, 1923
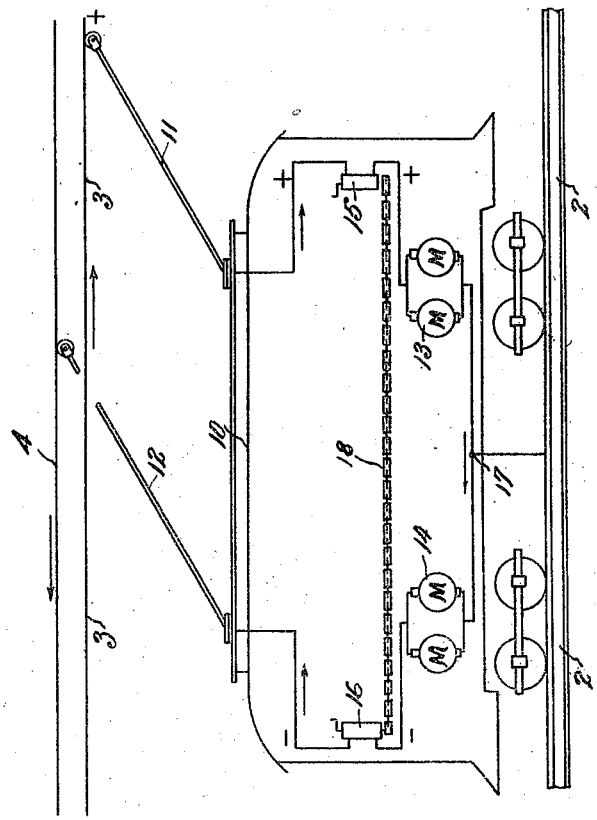
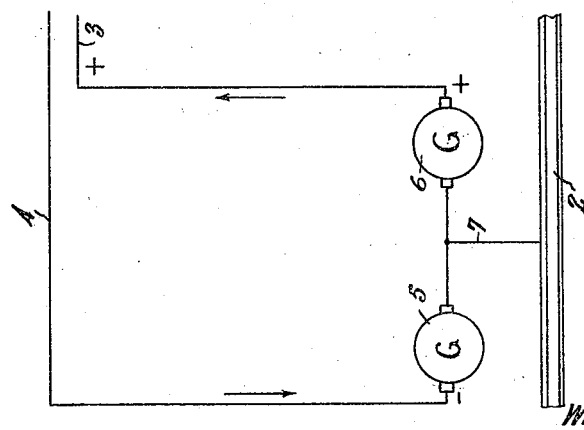
Inventor
William V. Hunt.
By Fred G. Dieterich Co.
Attorneys Patented May 27, 1924.

1,495,416

UNITED STATES PATENT OFFICE.

WILLIAM V. HUNT, OF VANCOUVER, BRITISH COLUMBIA, CANADA.

ELECTRIC RAILWAY SYSTEM.

Application filed February 19, 1923. Serial No. 619,966.

*To all whom it may concern:*

Be it known that I, WILLIAM V. HUNT, a citizen of the Dominion of Canada, residing at Vancouver, in the Province of British Columbia, Canada, have invented certain new and useful Improvements in Electric Railway Systems, of which the following is a specification.

This invention relates to a direct current electric railway system, wherein a standard car equipment adapted for operation for a certain voltage is supplied with current through conducting lines carrying a higher voltage, whereby the efficiency of the distribution is raised with the economy consequent thereon, as the necessity of large capacity track bonding and track feeders is avoided.

The invention is particularly described in the following specification, reference being made to the drawings by which it is accompanied, which represents diagrammatically the application of the system.

In this drawing 2 represents the track line and 3 and 4 parallel and adjacent trolley wires, or the third and fourth rail or underground conductors of a railway system of that class.

The electric current is supplied to these conducting lines 3 and 4 by two generators or rotary converters 5 and 6, which are connected in series between the conducting lines 3 and 4, the station ground connection being made at 7 from between the generators to the track line 2.

The car, represented by 10, is provided with two trolley poles 11 and 12 which deliver the current to and from two separate electric motor equipments 13 and 14, each equipment consisting of one or more electric motors, controllers 15 and 16, and the necessary circuit breakers, lightning arresters and other parts of a standard railway equipment.

One terminal of each motor equipment is grounded at 17 and the other is connected through the usual control apparatus to its individual trolley wire or line conductor 3 or 4.

The two controllers 15 and 16 are arranged to operate simultaneously either by gearing, such as an endless chain 18 over sprocket wheels on the controllers, as shown in the drawing, or by electrical means with a master controller.

In the normal operation, one electric motor equipment being connected by its trolley pole or contact shoe to one line 3 and the other to the other line 4, by means of the simultaneous operation of the controllers, the two electric motor equipments 13 and 14 are connected in series across the two conducting lines 3 and 4. The lines being supplied with electric power by the generators or converters 5 and 6, that are also in series across the two lines, any difference in the quantity of current demanded by each motor equipment is taken care of by the ground connection 17, which, as the generators are grounded through the connection 7, functions as an equalizer or load-balancing connection, and prevents the voltage between any part of the electric railway system and the ground, exceeding the voltage of one generator or rotary converter.

This invention doubles the efficiency of an electric railway distribution system, and does away with the necessity of large capacity track bonding and ground feeders.

The modification of this system is when multiple unit trains are operated, in which case the units may be divided between the conducting lines 3 and 4 and any difference in the total demand from the train of each conducting line will flow through the track or ground.

The normal direction of current from and to the generators 5 and 6 is indicated on the drawing by the arrows, from which it will be seen that the current does not flow into or through the track line 2, unless there is a difference in the current demanded by the motor equipments of the car or train.

This practically eliminates the risk of electrolytic destruction of pipe lines or other metal structures in the vicinity, as the main current flow is confined to the completely insulated conducting lines 3 and 4.

I am aware that a similar distribution of current is used in a three-wire lighting system, but such has not heretofore been applied to an electric railway system. The novelty of this application does not lie in the distribution of the current, but in the connection of separate motor equipments in each car or in different units of a train, in series between the positive and negative lines of the distribution system, with an intermediate ground connection to the track line to form the load-balancing connection, which, within my knowledge, has not heretofore been done.

Having now particularly described my invention, I hereby declare that what I claim as new and desire to be protected in by Letters Patent, is:

1. A direct current electric railway system, comprising the combination with two adjacent and parallel line conductors, of a number of direct current electric generators connected in series between the conducting lines, means for grounding the generators, a plurality of electric motor equipments on the train, each equipment connected in series with the conducting lines, a plurality of controllers for said equipments, means for simultaneously operating the controllers, and means for grounding each motor equipment of the train.

2. A direct current electric railway system, characterized in this that each car is provided with separate motor equipments which are connected in series between the positive and negative lines of the distribution system and that an intermediate ground connection to the track line is provided which is adapted to function as a load balancing connection.

3. A direct current electric railway system characterized in this that each car is provided with separate motor equipments which are connected in series between the positive and negative lines of a distribution system having a plurality of generators and that means are provided for preventing the voltage between any part of the system and the ground exceeding the voltage of one generator.

4. A direct current electric railway system, comprising the combination with two adjacent and parallel line conductors of a number of direct current electric generators connected in series between the conducting lines, means for grounding the generators, a plurality of electric motor equipments on the car, each equipment connected in series with the conducting lines and means for grounding the motor equipments of the car.

In testimony whereof I affix my signature.

WILLIAM V. HUNT.